(12) United States Patent
Boyd

(10) Patent No.: US 6,357,524 B1
(45) Date of Patent: Mar. 19, 2002

(54) SYSTEM FOR USING INERT GAS IN OIL RECOVERY OPERATIONS

(76) Inventor: Anthony Ray Boyd, 2204 Turnberry Dr., Loreauville, LA (US) 70552

( * ) Notice: Subject to any disclaimer, the term of this patent is extended or adjusted under 35 U.S.C. 154(b) by 0 days.

(21) Appl. No.: 09/272,029

(22) Filed: Mar. 18, 1999

(51) Int. Cl.[7] .......................... E21B 19/00; E21B 47/06
(52) U.S. Cl. .............................. 166/250.01; 166/75.11; 166/91.1; 166/379
(58) Field of Search .......................... 166/75.11, 77.51, 166/90.1, 91.1, 250.01, 379, 902; 251/355

(56) References Cited

U.S. PATENT DOCUMENTS

| | | | |
|---|---|---|---|
| 2,163,436 A | * 6/1939 | Raymond et al. | 166/90.1 |
| 2,316,383 A | * 4/1943 | Abercrombie | 166/91.1 |
| 2,465,580 A | 3/1949 | Ernst et al. | |
| 2,698,055 A | * 12/1954 | Williams | 166/75.11 |
| 2,728,726 A | * 12/1955 | Basset | 210/696 |
| 3,564,866 A | 2/1971 | Paine | 62/514 |
| 3,680,981 A | 8/1972 | Wagner | 417/388 |
| 4,068,468 A | 1/1978 | Wood et al. | 60/39.14 |
| 4,212,354 A | * 7/1980 | Guinn | 166/90.1 X |
| 4,292,804 A | 10/1981 | Rogers, Sr. | 60/407 |
| 4,541,365 A | 9/1985 | Jennings et al. | 122/451 |
| 4,570,673 A | * 2/1986 | Kendrick et al. | 166/90.1 X |
| 4,651,525 A | 3/1987 | Cestero | 60/416 |
| 4,721,158 A | * 1/1988 | Merritt, Jr. et al. | 166/250.01 |
| 4,777,801 A | 10/1988 | Porter | 60/595 |
| 5,209,301 A | * 5/1993 | Ayres | 166/90.1 X |
| 5,243,761 A | 9/1993 | Sullivan et al. | 30/134 |
| 5,585,555 A | * 12/1996 | McRae | 166/250.01 X |
| 6,073,666 A | * 6/2000 | Clark, II | 184/1.5 X |

* cited by examiner

Primary Examiner—George Suchfield
(74) Attorney, Agent, or Firm—Garvey, Smith, Nehrbass & Doody, L.L.C.

(57) ABSTRACT

A system for powering components on an oil drilling or production platform utilizing a relatively inert fuel, the system including a first plurality of tanks which contain carbon dioxide in the liquid phase; a second plurality of tanks for receiving the carbon dioxide under pressure in the liquid phase and flowing the carbon dioxide into the second plurality of tanks into a high pressure gaseous phase. There is further included a third low pressure tank which would receive the high pressure carbon dioxide from the second plurality of tanks into the tank under a substantially low pressure within the third tank. The third tank would be equipped with a means for flowing the carbon dioxide into a component such as a pump or engine so that the carbon dioxide serves as a fuel for driving the component and allowing the component to undertake a particular task on the rig floor such as the testing of lubricators grease units or an engine for driving certain functions of the rig. In the testing for example of lubricators on the rig, there may be further included a two-stage pump which would receive the carbon dioxide from the third tank and water from a water tank in order for the pump to pump the water into the lubricator system so as to test the lubricator on the rig floor.

16 Claims, 2 Drawing Sheets

US 6,357,524 B1

SYSTEM FOR USING INERT GAS IN OIL RECOVERY OPERATIONS

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The system of the present invention relates to utilization of $CO_2$ or other relatively inert gas for operating components in oil field operations such as a drilling rig or production platform. More particularly, the present invention relates to the utilization of stored liquid $CO_2$ which is converted to low pressure $CO_2$ gas for operation of pumps, lubricators, engines or other types of machinery on a production rig so as to eliminate the potential of fire or explosions.

2. General Background of the Invention

In the oil and gas industry, a great percentage of the hydrocarbon such as natural gas or crude oil is produced offshore through the use of a production rig placed in, for example, the Gulf of Mexico, where the production of the hydrocarbon in question is recovered at the platform and transported to storage. Because of the complexities involved in the production of hydrocarbons offshore, production rigs are very expensive and therefore the production rig is normally constructed so as to accommodate only the required machinery, or the like, on the rig in order to carry out the production tasks. Some of the machinery involved in the production of hydrocarbons offshore are various types of machinery that must be driven by a power source. Normally, the power source is a gasoline or diesel operated engine or pump so that the production can be continuous and uninterrupted. One of the hazards of utilizing gasoline driven or diesel driven engines or pumps on the rigs is that there is a great susceptibility to the hydrocarbon being produced causing a fire on the rig which would lead, of course, to the loss of the rig itself and even more serious, the loss of human life should a fire or explosion occur on the rig.

Therefore, there is a serious need in the industry for devising a system which could be utilized to drive the various components on a rig that would be normally driven by gasoline or diesel fueled engines or pumps, yet would be driven by a more inert fuel yet accomplish the same task to operate these components.

A search conducted in the art revealed several patents pertinent to this concept and these are included in the prior art statement submitted herewith.

BRIEF SUMMARY OF THE INVENTION

The system and method of the present invention solves the shortcomings in the art in a simple and straightforward manner. What is provided is a system for powering components on an oil drilling or production platform utilizing a relatively inert fuel, the system including a first plurality of tanks which contain carbon dioxide in the liquid phase; a second plurality of tanks for receiving the carbon dioxide under high pressure in the liquid phase and flowing the carbon dioxide into the second plurality of tanks into a first high pressure gaseous phase. There is further included a third tank which would receive the high pressure carbon dioxide from the second plurality of tanks into the tank under a substantially low pressure within the third tank. There is further provided a series of regulators for monitoring and controlling the pressure of the carbon dioxide as if is moved from the first tanks, through the second tanks and into the third tank.

Upon being received under a certain pressure in the third tank, the tank would be equipped with a means for flowing the carbon dioxide into a component such as a pump or engine so that the carbon dioxide serves as a fuel for driving the component and allowing the component to undertake a particular task on the rig floor such as the testing of lubricators grease units or an engine for driving certain functions of the rig. In the testing of lubricators, for example, on the rig, there may be further included a two-stage pump which would receive the carbon dioxide from the third tank and water from a water tank in order for the pump to pump the water into the lubricator system so as to test the lubricator on the rig floor.

Therefore, it is the principal object of the present invention to provide a system of power on a rig floor which incorporates a relatively inert gas such as carbon dioxide in order to drive certain components on the rig floor without the need for volatile fuel such as gasoline or diesel;

It is a further object of the present invention to provide a system for allowing an inert gas such as $CO_2$ or the like gas to be moved from a high pressure liquid phase to a low pressure gaseous phase for driving certain components on a rig floor such as a two-stage pump, a grease unit, or an engine utilized on the rig platform;

It is a further object of the present invention to provide a system whereby a relatively inert gas such as carbon dioxide is used in place of a highly volatile fuel such as gasoline or diesel fuel, which is utilized in stages so that in its final low pressure phase the carbon dioxide is able to drive components on the rig floor without the fear of any of the hydrocarbons being recovered from igniting due to the use of fuel driven engines on the rig floor.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figures 1A, 1B:
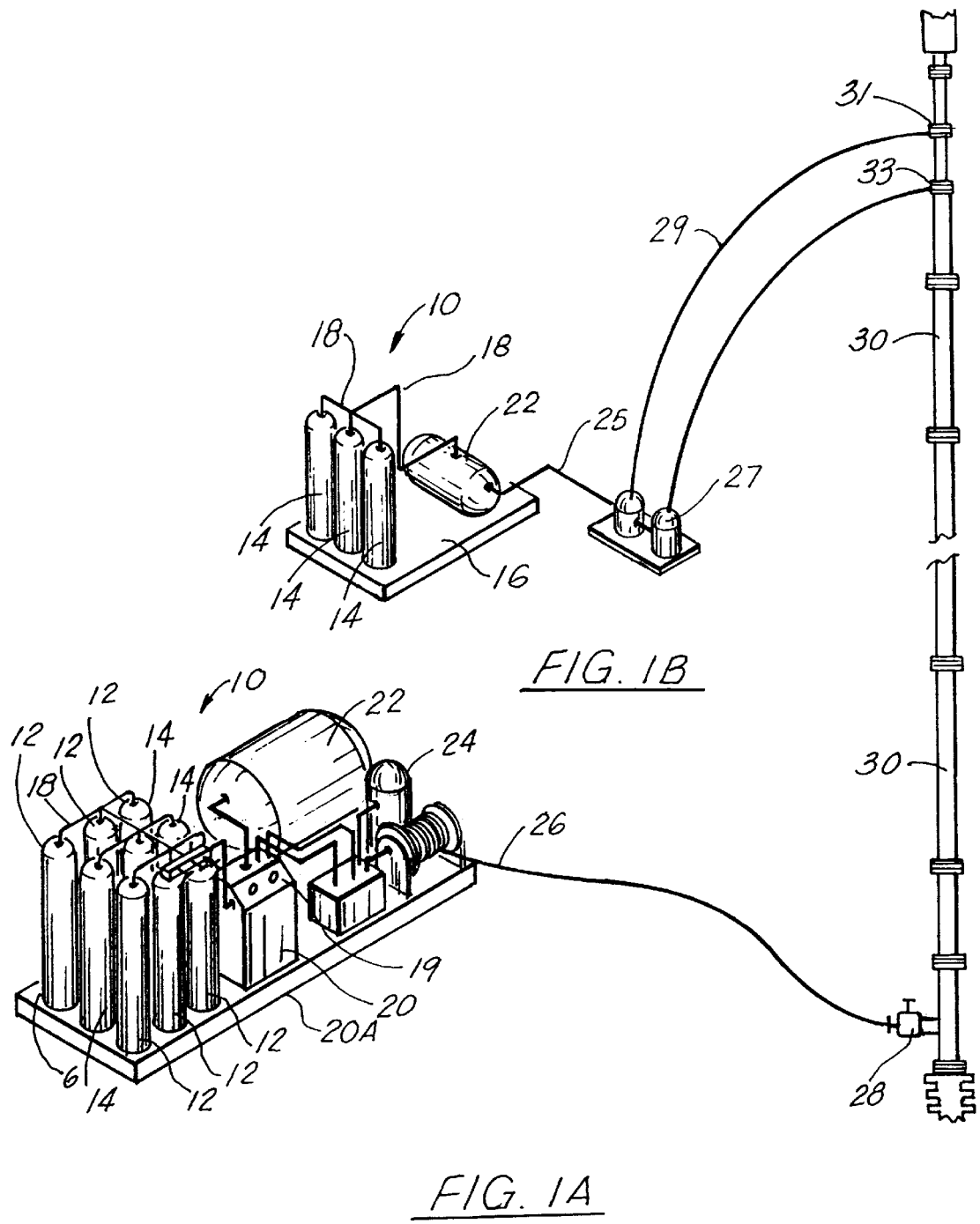
FIGS. 1A and 1B illustrate an overall view of the preferred embodiment of the system of the present invention utilized in a testing of a lubricator and the operation of a grease unit on the rig floor respectively.

FIGS. 1–4 illustrate the preferred embodiment of the system of the present invention by the numeral 10. As illustrated in FIG. 1A, there is seen the system 10 which comprises a first plurality of tanks 12, which total six separate tanks, and a second plurality of tanks 14 which comprise three tanks. The first plurality of tanks 12 and second plurality of tanks 14 are positioned upright on a platform 16 as illustrated in FIG. 1A. The plurality of the six tanks 12 would be utilized to house a quantity of inert gas such as carbon dioxide in liquid phase at a pressure greater than 1,000 psi. The second plurality of three tanks 14 would be positioned on platform 16 and would be interconnected to the first plurality of tanks 12 through a series of flow lines 18. For purposes of operation, the liquid inert gas or $CO_2$ that is contained in tanks 12 would flow, under a controlled rate and pressure, through lines 18 into the series of three tanks 14, and would convert from the high pressure liquid phase in tanks 12, into the lower pressure gaseous phase into the three tanks 14. The carbon dioxide would then be maintained in tanks 14 at the lower pressure gaseous phase, for example 750 psi. As can be expected, when the liquid $CO_2$ flows into the second tank 14, it undergoes a great deal of expansion, as it converts into the gaseous phase, so that a relatively small amount of the liquid carbon dioxide in the fluid phase in tanks 12 will flow into the three tanks 14 and occupy the tanks 14 under the 750 psi desired pressure.

Further, as seen in FIG. 1A, there is seen a control panel 19 which includes a series of gauges 20A for regulating and maintaining the pressures within tanks 12 and 14 at their desired levels as explained earlier and to regulate any flow of the gaseous carbon dioxide out of tank 14 through the regulator system 20. Upon the regulator system 20 receiving the flow of carbon dioxide in its first gaseous phase from tank 14, the carbon dioxide gas would then flow into a single, low pressure tank 22, which is also housed on platform 16, and would receive the flow of $CO_2$ to a maximum pressure of 150 psi. Again, because the carbon dioxide gas is going from a high pressure gaseous phase at 750 psi to a lower pressure phase of 150 psi, a relatively small quantity of the high pressure gas will fill take 22 at the 150 psi pressure.

Therefore, in essence, the carbon dioxide has stepped down from the fluid phase at over 1,000 psi through an intermediate high pressure gaseous phase of 750 psi and then into a third tank 22 where gas is then maintained at a low pressure gaseous phase of 150 psi. It is at this low pressure state within tank 22 that the gaseous $CO_2$ is then ready to be moved from the tank 22 through line 26 so that it may be used to conduct certain functions on the rig.

For example, as seen in FIG. 1A, there is also illustrated a water tank 24 which would be fed into a line 26 for being used as a testing medium for a lubricator 28 as seen on the production string 28 as seen in FIG. 1A. The flow of the water in tank 24 through line 26 would be controlled by the pressure of the $CO_2$ in tank 22 as it went into lubricator 28 and conducted the integrity tests on tests on the lubricator 28.

Turning now to FIG. 1B, there is seen a modified system 10 which would utilize the three tanks 14 which are storing the $CO_2$ or other like inert gas in the first gaseous phase at approximately 750 psi. Each of the three tanks 14 would be connected via a flow line 18 and with flow line 18 flowing into again the storage tank 22 where the pressure is reduced down to 150 psi. In this modified version of the system set on platform 16, the tank 22 through, a regulating valve would then transport $CO_2$ under pressure at around 150 psi through line 25 into a pair of grease units 27. The pressurized $CO_2$ would supply sufficient pressure for the grease units 27 to supply grease under pressure through lines 29 for lubricating structures 31, 33 on the production string 30. Again, in both of these uses as seen in FIGS. 1A and 1B, it is clear that the $CO_2$ is being utilized as a source of fuel to operate both the lubricator and the grease unit without the need for volatile fuel such as gasoline and diesel.

Figure 2:
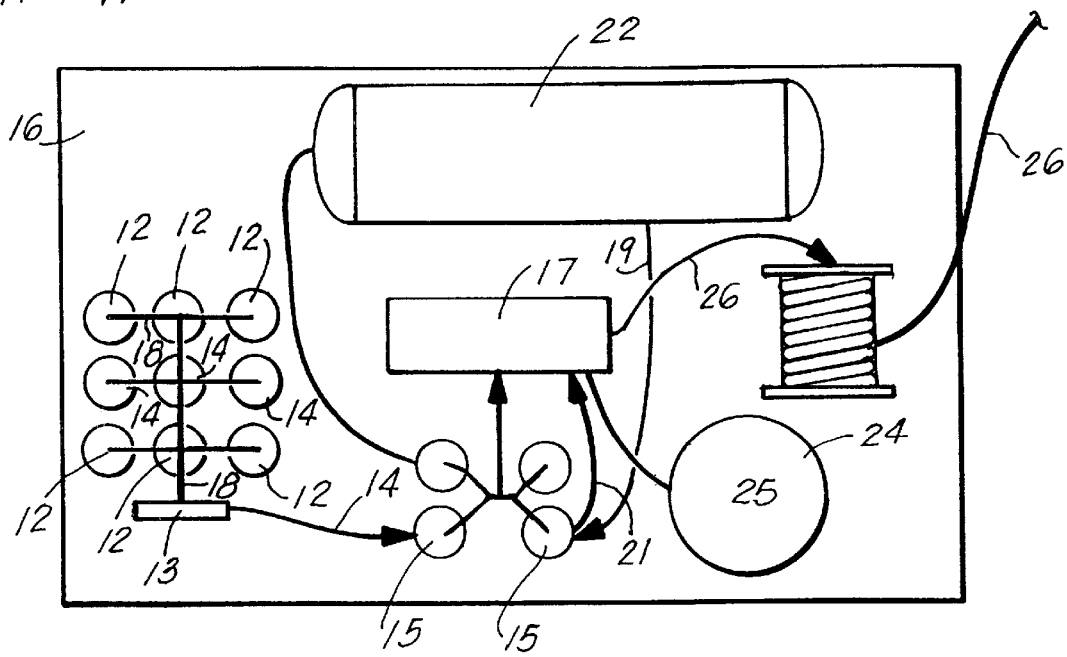
FIG. 2 illustrates a representational view of the preferred embodiment of the present invention utilized in conjunction with a lubricator testing unit.

FIG. 2 illustrates a top representational view of the system as seen in FIG. 1A, again which includes the plurality of first tanks 12 and the plurality of second tanks 14 being positioned on a platform 16 as illustrated. Again, the various tanks 12 and 14 are interconnected via a series of flow lines 18 so that the $CO_2$ under high pressure liquid phase in tanks 12 would flow into tank 14 so that it is contained within tanks 14 at a first high pressure gaseous phase. Following the flow into tanks 14, a series of valves 13 would be utilized to allow the flow of $CO_2$ into storage tank 22. From storage tank 22, where the pressure is at around 150 psi, the carbon dioxide would then be directed into a first stage pump 17. Pump 17 would receive water from the water tank 24 and the pump 17 would then pump the water 25 within tank 24 through the water line 26 where it would then go into the test lubricator 28 as illustrated in FIG. 1A. As illustrated, the gas flowing through line 18 out of tank 14 would flow into the regulators 15 to make certain that the gas is at the proper pressure (750 psi) where it would then flow into the single tank 22 where it would be reduced to 150 psi. Following its flowing into tank 22 it would flow out of tank 22 through line 19 where then it would flow into another regulator 15 to make certain that the $CO_2$ is at the proper pressure. It would then flow through a second line 21 into the pump 17 which would pump the water 25 through line 26 to the lubricator 20.

Figure 3:
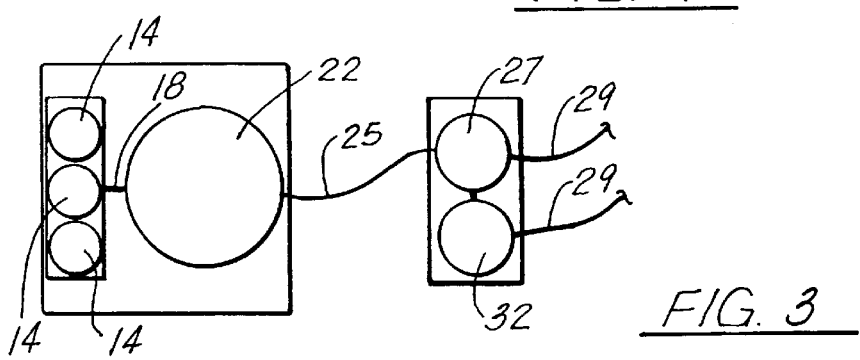
FIG. 3 illustrates a representational top view of the preferred embodiment of the present invention utilized with a grease unit on the rig.

FIG. 3, is a top representational view that was illustrated in FIG. 1B showing the three tanks 14 with the $CO_2$ in the first gaseous phase at 750 psi flowing through a line 18 into the single tank 22 where it would be reduced down to 150 psi. The carbon dioxide then would be fed through line 25 into the grease units 27 where again it would flow into line 29 to grease certain components on the production string 30 as seen in FIG. 1B.

Figure 4:
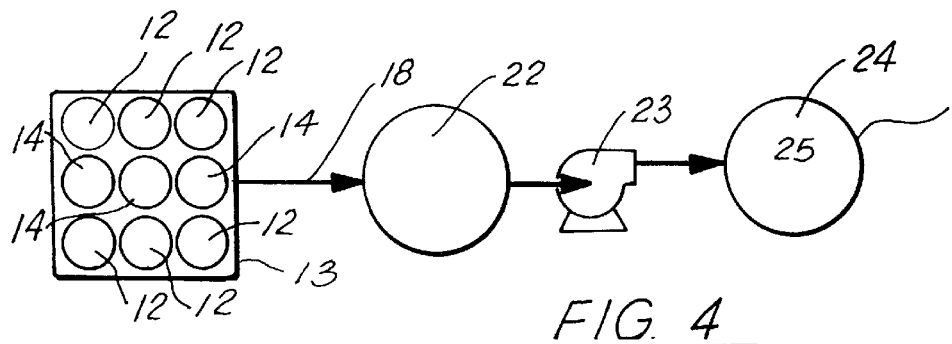
FIG. 4 illustrates a representational top view of the preferred embodiment of the present invention utilized with a pump for testing a lubricator on the rig floor.

In FIG. 4, there is yet another embodiment which again shows a representational view of the six high pressure liquid phase tanks 12 containing the liquid $CO_2$, the three gaseous stage tanks 14 for the first gaseous phase $CO_2$, which would then be directed through line 18 to the single low pressure tank 22 so that the $CO_2$ would be at 150 psi. At this pressure, the carbon dioxide would flow into a pump 23 which would then supply the pressure for having water 25 within a tank 24 to flow to the production string 30 for testing units on that string.

The foregoing embodiments are presented by way of example only; the scope of the present invention is to be limited only by the following claims.

What is claimed is:

1. A method for using an inert gas in oil and gas recovery, comprising:
   a. providing a first quantity of the inert gas contained under pressure in a liquid phase;
   b. flowing a portion of the first quantity of the inert gas in a liquid phase as a second quantity of the gas under reduced pressure in a gaseous phase;
   c. flowing a portion of the second quantity of gas in a gaseous phase into a third quantity of the gas in the gaseous phase under a further reduced pressure; and
   d. flowing the third quantity of gas in a gaseous phase to a device for serving as a source of power to operate the device.

2. The method in claim 1, wherein the device to be operated includes a grease unit, lubricator, on a production rig.

3. The method in claim 1, wherein the inert gas comprises carbon dioxide.

4. The method in claim 1, wherein the first quantity of inert gas is contained in a liquid phase at a pressure of around 1000 psi.

5. The method in claim 1, wherein the second quantity of gas is contained in a gaseous phase at a pressure of around 750 psi.

6. The method in claim 1, wherein the third quantity of gas is contained in a gaseous phase at a pressure of around 150 psi.

7. The method in claim 1, wherein there is further provided a series of regulators to monitor and control the pressure of the inert gas as the gas moves from the first, second and third pressure states.

8. A system for operating components in the recovery of oil and gas on a production rig, comprising:
   a. a first quantity of carbon dioxide stored in a liquid phase under a first high pressure;
   b. means for receiving the first quantity of carbon dioxide into a second gaseous phase under less pressure than the first liquid phase of carbon dioxide;
   c. means for receiving the second gaseous phase of the carbon dioxide gas to a third gaseous phase under less pressure than the second gaseous phase;
   d. means for flowing the carbon dioxide gas in the third gaseous phase to a component on the rig for operating the component by the carbon dioxide gas.

9. The system in claim 8, wherein the carbon dioxide in the three different phases is maintained within storage tanks under certain pressures.

10. The system in claim 8, wherein the first liquid phase is at around 1000 psi, the second gaseous phase is at around 750 psi, and the third gaseous phase is around 150 psi.

11. The system in claim 8, wherein there is further provided a series of regulators to monitor and control the pressure of the carbon dioxide as the carbon dioxide moves from the first, second and third pressure phases.

12. A method for operating components on a rig through the use of an inert gas, under pressure, comprising:
   a. providing a first plurality of tanks containing inert gas under at least 1000 psi;
   b. providing a second plurality of tanks for receiving a portion of the inert gas from the first plurality of tanks in the gaseous medium under a reduced pressure of around 750 psi;
   c. providing a third storage tank for receiving a portion of the inert gas from the second plurality of tanks in a gaseous medium under a lower pressure not exceeding 150 psi;
   d. regulating and monitoring the condition of the inert gas as it travels between the first, second, and third tanks;
   e. controllably flowing the inert gas from the third tank to the component, in sufficient quantity to power the grease unit for delivering grease to a component on the rig floor to be lubricated.

13. The method in claim 12, wherein the inert gas comprises nitrogen, carbon dioxide or some other inert gas.

14. The method in claim 12, wherein the method serves to power a pump on the rig.

15. The method in claim 12, wherein there is further provided a source of water for flowing under the force of the pressurized carbon dioxide to conduct tests on the rig.

16. The method in claim 12, wherein there is further provided a platform for housing the first, second, and third tanks and a pump and source of water in a closed and compact configuration.

\* \* \* \* \*